United States Patent [19]

Sanders

[11] Patent Number: 5,314,212
[45] Date of Patent: May 24, 1994

[54] DUCT CONNECTOR FOR LEAKFREE ATTACHMENT TO THE CURVED SIDEWALL OF HIGHLY FLEXIBLE TRUNKLINE DUCT

[75] Inventor: Gregory C. Sanders, Ocala, Fla.

[73] Assignee: GCS Innovations, Inc., Lake Mary, Fla.

[21] Appl. No.: 962,241

[22] Filed: Oct. 16, 1992

Related U.S. Application Data

[63] Continuation-in-part of Ser. No. 754,061, Sep. 3, 1991, abandoned.

[51] Int. Cl.$^5$ ............................................. F16L 41/08
[52] U.S. Cl. .................... 285/197; 285/424; 285/204; 285/222; 285/189; 29/513; 29/890.148
[58] Field of Search ............... 29/513, 890.148; 285/197, 424, 204, 205, 222, 189

[56] References Cited

U.S. PATENT DOCUMENTS

| | | | |
|---|---|---|---|
| 562,067 | 6/1896 | Copeland | 285/222 |
| 1,860,346 | 5/1932 | Anderson | 29/890.148 |
| 2,463,593 | 3/1949 | Boardman | 285/424 |
| 2,475,007 | 7/1949 | Carlson | 285/204 |
| 2,963,783 | 12/1960 | Field | 285/424 |
| 3,477,745 | 11/1969 | Williams et al. | 285/40 |
| 3,940,837 | 3/1976 | Wiese | 285/222 |
| 4,009,895 | 3/1977 | Koskolos | 285/424 |
| 4,123,093 | 10/1978 | Newland | 285/424 |
| 4,147,382 | 4/1979 | Wachter | 285/424 |
| 5,056,704 | 10/1991 | Martin et al. | 285/286 |

Primary Examiner—Eric K. Nicholson
Attorney, Agent, or Firm—Julian C. Renfro

[57] ABSTRACT

A duct fitting of generally cylindrical configuration for attachment to a relatively large, generally cylindrically-shaped flexible duct having a curved sidewall of easily deformed material, in which sidewall a hole of particular size has been created. This duct fitting is constructed of deformable sheet material and has first and second open ends, with the first end having a curvature conforming to the configuration of the curved sidewall of the flexible duct. The second end of the duct fitting is adapted to receive thereon, a relatively small branch duct to be connected in a leak-free manner to the flexible duct. In accordance with this invention, the first end of the duct fitting has a plurality of short, lateral slots disposed at spaced locations around its circumference, thus to define a plurality of bendable teeth arranged in a non-planar array. These teeth are insertable into the hole created in the curved sidewall of the flexible duct, and then bent over into conforming engagement with the curved interior surface of the flexible duct, thus to lock the duct fitting into the flexible duct. I may use a flat ring of curved contour on the exterior of the duct fitting for limiting the insertion of the first end of the duct fitting into the flexible duct, and I may use a second flat ring on the interior of the flexible duct, for preventing any tearing by the teeth of the interior of the flexible duct.

23 Claims, 4 Drawing Sheets

DUCT CONNECTOR FOR LEAKFREE ATTACHMENT TO THE CURVED SIDEWALL OF HIGHLY FLEXIBLE TRUNKLINE DUCT

RELATIONSHIP TO PREVIOUS INVENTION

This application is a continuation-in-part of my pending patent application entitled "AIR-CONDITIONING/HEATING DUCT TAP-IN CONNECTOR AND METHODS," Ser. No. 07/754,061, which was filed Sep. 3, 1991, and which is intended to be abandoned upon the filing of this patent application.

BACKGROUND OF THE INVENTION

1. Field of the Invention

This invention relates generally to ducting as used in air conditioning and heating systems, and more particularly to a duct fitting specifically contoured to be used with highly flexible ducting in a multi user system.

2. Description of the Prior Art

It is customary in the heating, cooling and ventilating field to use a main or trunk duct, having extending from it one or more branch ducts. Various fittings have been proposed for connecting a branch duct to an associated main duct. One manner of attaching a fitting to a duct is shown in U.S. Pat. No. 3,290,066 to Primich et al entitled "Sheet Metal Pipe Fitting," which issued Dec. 6, 1966. In that device, a plurality of tabs formed so as to extend axially from the fitting are to be bent over in order to secure the fitting on an associated duct. A significant problem, however, exists with regard to time, tools and the relatively high degree of skill required to accurately cut a properly sized hole in the trunk duct. Such a trunk duct may of course be constructed from rigid or from flexible material, such as reinforced fiberglass and the like. As will be seen hereinafter, the duct fitting forming the subject matter of this invention is primarily configured for use with highly flexible ducting, although it may also be utilized with certain diameter rigid ducting.

U.S. Pat. No. 3,349,792 issued to Larkin on Oct. 31, 1967, and U.S. Pat. No. 3,609,056 issued to Hougen on Sep. 28, 1971, disclose examples of hole cutting tools which can be used for cutting holes in prior art air conditioning ducting. A basic disadvantage of such approach, however, is that a large number of cutting tools of various sizes must be kept available in order to cut a hole which is sized properly for a specific duct fitting. Further, there can be difficulty in inserting a fitting into a hole cut for it, if the precut hole is irregular, or too small. If the hole is too large, the fitting will be loose and most likely it will be a source of undesirable air leakage.

Another problem encountered with the installation of branch duct fittings to main ducts of air conditioning systems, and the like, is that there must be found a manner of attaching the fitting to the duct. Other than the use of the aforementioned bent tabs, it is a common practice to employ bolts and similar fasteners which result in projection of the ends of the fasteners into the main duct. Such projections are generally quite undesirable, inasmuch as they cause turbulence in the air stream within the duct.

Accordingly, it is well known in the art to provide quick connection arrangements on duct fittings in order to eliminate the attachment problems referred to above, as well as to insure a good fit between the fitting and an associated duct. Examples of such quick connections can be found in U.S. Pat. No. 3,477,745 issued Nov. 11, 1969 to J. W. Williams et al and U.S. Pat. No. 3,915,477 issued Oct. 28, 1975 to D. R. Timmons. These fittings are intended specifically for use with reinforced fiberglass ducts and employ helical rings formed about the periphery of the connection end of the fitting, which permit the connection end of the fitting to be threaded through a precut hole. Once threaded through the duct, the split ring or flange retains the fitting in place on the duct.

With the latter approach, however, not only is it first necessary to precut a hole in the associated duct, the problems of which are discussed above, but also, during insertion of the fitting into the hole, the helical rings tend to tear or shred the wall in the area circumscribing the hole. This also is the case two, with U.S. Pat. No. 3,726,545 entitled "Air Duct Connector," which issued Apr. 10, 1973 to J. R. Grim et al. This latter patent discloses an air duct connector especially for use with reinforced fiberglass ducts in which the leading edge of the connector is provided with widely spaced cutting teeth for initially forming a circular aperture in the duct wall. Widely spaced radially extending tabs are provided proximate the cutting teeth for being threaded into the hole during cutting thereof to lock the fitting in the hole in the fiberglass duct or plenum chamber wall.

Besides tearing, or shredding the wall, a disadvantage of the construction suggested by Grim is that the cutting teeth, which are not intended to be bent over, will extend into the fluid flow path of the trunk duct so as to cause turbulence therein. Further, it is highly desirable to remove the cutout portion, or slug, of the duct wall from the interior of the duct, for such cutout portion could cause turbulence, air flow restriction, noise, and the like if left in the duct. In an instance in accordance with the Grim teaching, the workman concerned with the removal of the cutout portion must work very carefully through the mounting fitting in order to avoid being injured by the projecting cutting teeth.

Poorly fashioned cuts, such as result from the precutting of holes by the freehand use of a knife, razor blade, and the like, as required in some of the hereinbefore described prior art fittings, usually results in loose fits and highly undesirable air leakage. Over a period of months, this can amount to a serious amount of wastage. Also, sidewall tearing or shredding resulting from the use of other above discussed prior art fittings can result in leakage-prone weak spots in the areas where the fittings are mounted to the trunk duct. Furthermore, it is most important to keep shredded fibers out of the air moving in the duct system, to prevent the known health hazard associated with airborne fibers.

Regardless of the technique used to mount a branch line fitting in a main or trunk duct, a problem has long existed with regard to diverting air out of the airflow stream in the trunk duct into the branch duct. In many prior art systems, this air diversion problem is simply ignored, with the result being that the pressure of the air in the trunk duct will be totally relied upon to cause a suitable amount of air to move into the branch duct. In many instances, the failure to accomplish a dynamic redirecting of the air flowing in the trunk duct results in inadequate air flow in the branch lines.

The Goettel U.S. Pat. No. 4,491,124 entitled "Self-Tapping Duct Fitting," which issued Jan. 1, 1985, attempted to solve the air diversion problem by pivotally mounting a flat plate damper in the duct fitting and providing a suitable linkage so that subsequent to fitting installation, the damper could be moved to a fully open position wherein a relatively small portion of the flat plate extends from the fitting into the air stream of the trunk duct. While this improved the situation with regard to the abovediscussed air diversion problem, the air striking the flat plate damper was found to create considerable turbulence both in the trunk duct and in the branch duct, and acted as a restriction in those air streams. In addition, the relatively expensive damper, its mounting arrangement, and the needed linkage proved to be far too costly for the minimal results achieved therefrom.

The Goettel U.S. Pat. Nos. 4,491,124 and 4,569,110 are related to cutting tap-in orifices and tapping into rectangular ducts, rather than tapping into cylindrical ducts of flexible material, as taught by this invention. The Goettel patents represent a manifest relationship to the sheet-metal technology of the prior art, which is in distinct contrast to insulated spiral-tube flexible forms in combination with sheet-metal devices, as more recently developed.

The Nash U.S. Pat. No. 4,294,476 is also related to metal ductwork connections. The Harris U.S. Pat. No. 4,249,758 teaches joining a tubular member to a flat component such as a rectangular junction box or a sheet-metal duct.

The Wachter U.S. Pat. No. 4,147,382 entitled "Connecting Piece for a Branch Duct to a Substantially Round Air Conditioning Duct," describes the joining of cylindrical trunk tubes to cylindrical branch tubes, but in a somewhat different manner than earlier taught. The Wachter patent employs an elongate base on a branch tube that was connected to a trunk tube with a rectangular-to-cylindrical geometry rather than right-angle tubular-intersection joints.

The Grim et al U.S. Pat. No. 3,726,545 and the Primich et al U.S. Pat. No. 3,290,066, each previously mentioned, likewise taught joining of a circular branch member to a plenum chamber in the form of a junction box or flat-walled duct. Primich et al, Goettel and others have taught the use of tabs bendable to form a flange effect, but in a different form and relationship of parts than employed in this invention, as will be seen hereinafter. All of these prior patents relate to junctures with flat surfaces.

The Rice et al U.S. Pat. No. 4,491,349 entitled "Y-Connection for Flexible Conduit," which issued Jan. 1, 1985, is designed for use with a thin wall metal main conduit which has a plurality of grooves or corrugations extending around its periphery, "to provide the conduit with a degree of flexibility." The patentees describe that they utilize an inner shoe of sheet metal provided with a centrally disposed hole, as well as a saddle, with the inner shoe being intended to be inserted in through a hole several inches in diameter that is cut into the metal conduit that Rice et al are concerned with. The inner shoe is brought into a desired alignment with the hole in the conduit, with the tabs disposed around the periphery of the hole in the inner shoe being bent so as to extend upwardly through the hole in the metal conduit, and then pressed back against the outer face of the metal conduit. At this point the saddle with its short section of branch conduit is mounted over the hole in the metal conduit, in a desired relationship with the inner shoe. As described by the patentees Rice et al, rivets, spot welds or other suitable means are utilized to secure the tabs to the saddle.

It is important to note that both the internally positioned shoe and the externally positioned saddle utilized by Rice et al are stated to be dimensioned to extend around approximately 160° of the periphery of the metal conduit. Quite clearly, the weight of such large and bulky components as suggested by Rice et al would not be suitable for use with highly flexible ducting, and Rice et al do not in any manner explain how their heavy devices could be attached in any suitable and appropriate manner to light-duty flexible ducting. Also, the use of the Rice et al technique requires the workman to have access to the end of the duct in order that the shoe can be inserted. As will be seen hereinafter, end access is not required for the installation of the novel duct fitting in accordance with this invention.

It is manifestly obvious that Rice et al are not dealing with attachment to the same type of highly flexible ducting as is involved in the present invention. As pointed out hereinabove, the wording set forth in the Rice et al patent describes that the patentees utilize a metal main conduit equipped with a plurality of grooves or corrugations that provide the conduit with "a degree of flexibility," but Rice et al make absolutely no mention of any use with the highly flexible ducting with which the present invention is principally intended for use. The flexible conduit with which Rice et al are concerned would be able to be bent only to a limited extent in order to be able to pass around an obstacle in the path of the ducting, and such conduit could not tolerate short radius turns, as could the highly flexible ducting being principally referred to in conjunction with the instant invention. Also, the flexible conduit utilized by Rice et al could not withstand without substantial damage, any partial collapse of the conduit sidewalls, amounting to a reduction in diameter. In distinct contrast, the highly flexible ducting with which the present invention is principally concerned could clearly be utilized in the situation in which the ducting is caused to pass through a narrow opening or passageway, for any reduction in the diameter would cause no intrinsic damage to the highly flexible ducting, for it would merely increase in diameter at a location 90° to the location where the diameter has been reduced.

Another important point of distinction is that some 25 feet of the flexible metal conduit utilized by Rice et al could not possibly be compressed into a box approximately 30 inches long, as can the highly flexible ducting with which the instant invention is involved.

It is therefore most important to realize that the absence of effective devices and methods for joining round branch tubes to highly flexible trunk tubes in a desirable perpendicular relationship represents a distinct deficiency of all of these prior art devices. Quite unfortunately, the prior art has not taught an effective, efficient, low-cost and non-hazardous right-angle, direct joining of round branch air-conditioning/heating ducts to round, highly flexible ducts utilized as air-conditioning/heating trunks, as is taught by the instant invention.

It is an important goal of this invention to provide a new and highly improved duct fitting and method for mounting thereof which overcomes the problems and shortcomings of the prior art, and greatly improves the procedures for securing branch lines to trunk ducts made of highly flexible ducting.

SUMMARY OF THE INVENTION

A duct fitting in accordance with this invention is of generally cylindrical configuration, with one end of the fitting possessing a curved configuration particularly contoured for attachment in an essentially perpendicular relationship to the curved sidewall of a relatively large cylindrically-shaped duct constructed of highly flexible, easily deformed insulating material. This flexible air duct material is variously known as flex duct, Thermaflex, and Dura-Flex. The Flexible Tubing Division of Automation Industries, Inc., the manufacturer of Thermaflex, describes its ducting as being constructed of a polymeric inner duct bonded permanently to a coated spring steel wire helix, and supporting a thick fiberglass insulating blanket. A low permeability outer vapor barrier, preferably of metallized mylar completes the assembly.

Excel Manufacturing Company of Wiggins, Miss., the manufacturer of Dura-Flex, markets flexible ducting in various diameters and utilizing various materials. As one example, Excel describes one of its products as reflecting temperature and resisting friction, with another product being a heavy duty insulated flexible duct with a tough polymer jacket designed for use in adverse temperature and humid conditions. Still another Excel product is touted as being an insulated flexible duct ideal for mobile homes and manufactured housing, having a thick, copolymer jacket protecting the insulation from moisture. Excel describes that their spring steel helix wire prevents ballooning and collapsing, with their standard, 25 foot lengths being compressible into boxes 30 inches long.

Atco, a company with offices in Chicago, New York and San Francisco, manufactures their 70 Series flexible ducting as being suitable for supply and return air ducting in residential and commercial low-to-medium pressure heating and air conditioning systems. It is stated to be usable as a complete air duct system and/or a branch duct connecting to mixing boxes, diffusers, light troffers, room inlets, or other terminal devices. As to construction, Atco describes their flexible ducting as a double lamination of tough polyester which encapsulates a steel wire helix, thus to form an air-tight inner core serving to prevent the erosion of fiberglass into the airstream. The double layer core is enclosed in a thick blanket of fiberglass insulation and in preferred instances is sheathed in a rugged and durable metallized mylar jacket, with such jacket being described as tear and puncture resistant.

Quite obviously my novel duct fitting having one end configured for attachment in a leak-free, essentially perpendicular relationship to the curved sidewall of a relatively large duct constructed of highly flexible, easily deformed insulating material is not limited for use with the product of any particular company. Rather, my novel duct fitting may be utilized with the highly flexible ducting manufactured by any of a number of different manufacturers, and the companies mentioned hereinabove are set forth only by way of illustrating the type of highly flexible product with which my novel duct fitting is to be used.

It is to be understood that when I refer to my duct fitting being ideal for use with highly flexible ducting, I am referring to products with relatively soft sidewalls, that may be easily deformed or bent so as to easily pass around obstacles disposed in the path of the ducting. An important characteristic of the type of highly flexible ducting with which my duct fitting is principally intended for use is ducting that is readily adapted for compression packaging for efficient shipping, warehousing and handling on the job, with one example of this being the capability of a standard 25 foot length of such ducting being compressible into a box approximately 30 inches long.

As to the particular configuration of my novel duct fitting, it may be described as having first and second open ends, with the first end having a curvature closely conforming to the configuration of the curved sidewall of the large duct with which it is to be used. The second end of the duct fitting may be of planar construction, being adapted to receive thereon, a relatively small branch duct that is to be connected in a leak-free manner to the large duct of highly flexible material.

The first end of my novel duct fitting has a plurality of short, lateral slots disposed at spaced locations around its circumference, thus to define a plurality of bendable teeth or fingers arranged in a non-planar array of suitable curvature. The teeth of the first end are intended to be inserted into a hole of suitable size cut into the curved, highly flexible sidewall of the large duct, with such teeth then to be bent over into conforming engagement with the curved interior surface of the large duct.

To prevent my novel duct fitting from extending too far into a large trunk duct of highly flexible material, I prefer to utilize a ring encircling the periphery of the duct fitting, adjacent the base of the teeth extending along the curved edge of the duct fitting. This ring is of flexible material, has sufficient height to rest against the curved outer sidewall of the trunk duct, and it will hereinafter be referred to as the first ring. This first ring is secured to the duct fitting in a configuration closely matching the contour of the curved outer sidewall of the large, highly flexible duct.

To prevent the edges of the teeth from cutting or damaging the interior sidewall of the trunk duct of highly flexible material, I prefer to use a second ring of flat material, which is to be inserted into the interior of the trunk duct, and caused to conform to the interior contour of the large duct. This second ring has sufficient diameter as to prevent the outer portions of the teeth of the duct fitting coming into contact with the interior of the flexible trunk duct, subsequent to the teeth being bent over into positions such that they do not interfere with air flow through the large duct.

As to the installation of my novel duct fitting in a hole in highly flexible ducting, the workman extends his arm into the duct fitting and by the suitable application of pressure, he accomplishes a degree of compacting of the sidewall of the flexible ducting between the inner and outer rings, this compacting of course taking place in the immediate vicinity of the hole in the flexible ducting. At this time, the workman bends over the teeth of the duct fitting into firm contact with the second or inner ring, thus to hold the fitting in a tight, virtually leak-free relationship with the highly flexible ducting.

It is therefore obvious that the first and second (inner and outer) rings serve as a form of structural support for the sidewalls of the flexible ducting, as well as a highly effective means for securing the components in a virtually leak-free relationship as a result of the rings undertaking an appropriate curvature as they tightly grip the flexible ducting therebetween. This curvature of the rings closely approximates the natural curvature of the highly flexible duct.

As should be obvious, my novel duct fitting or branch line connector is primarily designed for use with highly flexible duct, but in some circumstances it can be used with certain sizes of round metal duct, such as metal duct 10 inches or 12 inches in diameter, or possibly sizes larger than this.

It is a principal object of my invention to provide an improved duct fitting of relatively low cost, that can be utilized with highly flexible ducting in a greatly simplified, virtually leak-free manner, without necessitating the use of any obstruction in the interior of the highly flexible ducting.

It is another object of my invention to provide a duct fitting wherein one end of the fitting possesses a curvature closely conforming to the curved sidewall of highly flexible ducting, such that the fitting can be connected, with a minimum expenditure of labor, to a hole of suitable size in the highly flexible ducting, accomplished in a secure, essentially leak-free manner.

It is yet another object of my invention to provide a highly affordable duct fitting wherein one end of the fitting includes a plurality of teeth arranged in a contour that conforms to the curvature of the sidewall of the flexible ducting, which teeth are to be inserted into a hole cut in the flexible ducting and then bent over to prevent undesired separation of the joint, with means being utilized to prevent such teeth from cutting the interior of the ducting.

It is yet still another object of my invention to provide a highly effective duct fitting wherein a curved end of the fitting can include the use of a contoured plurality of teeth to be inserted into a hole cut in the sidewall of highly flexible ducting, with support means used inside and outside the flexible ducting at the location of the hole such that an effective compacting of the curved sidewall of the ducting can be accomplished, followed by the teeth being bent over to accomplish a tight, essentially leak-free joinder of the duct fitting to the curved sidewall of the flexible ducting.

It is yet another object of my invention to provide a considerably improved duct fitting with a curved end closely conforming to the curvature of the sidewall of highly flexible ducting, with such fitting comprehending the use of flat, flexible rings utilized in the interior as well as on the exterior of the juncture with the highly flexible ducting, thus to assure a highly advantageous, secure, virtually leak-free connection with the flexible ducting, with any consequential obstruction to the flow of air through the flexible ducting being carefully avoided.

These and other objects, features and advantages will be more apparent from a study of the appended drawings and accompanying description.

DETAILED DESCRIPTION

Figure 1:
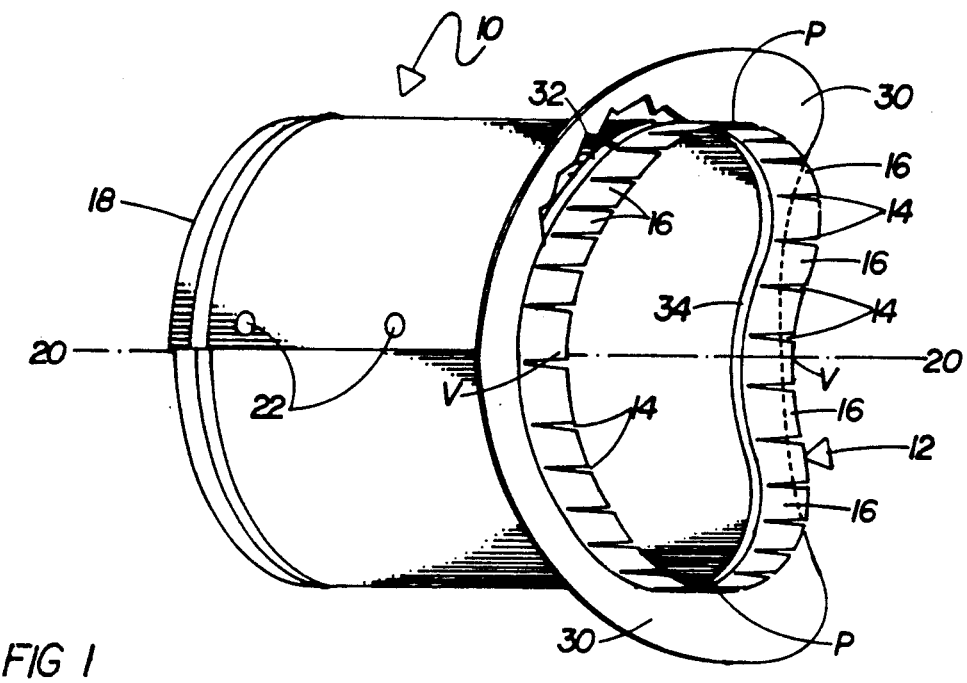
FIG. 1 is a perspective view of my novel duct fitting intended for use with highly flexible trunk ducting, with this view showing the distinct curvature featured at one end of the fitting, which curvature can closely conform to the curved sidewall of the relatively larger diameter, highly flexible ducting.
Figure 3:
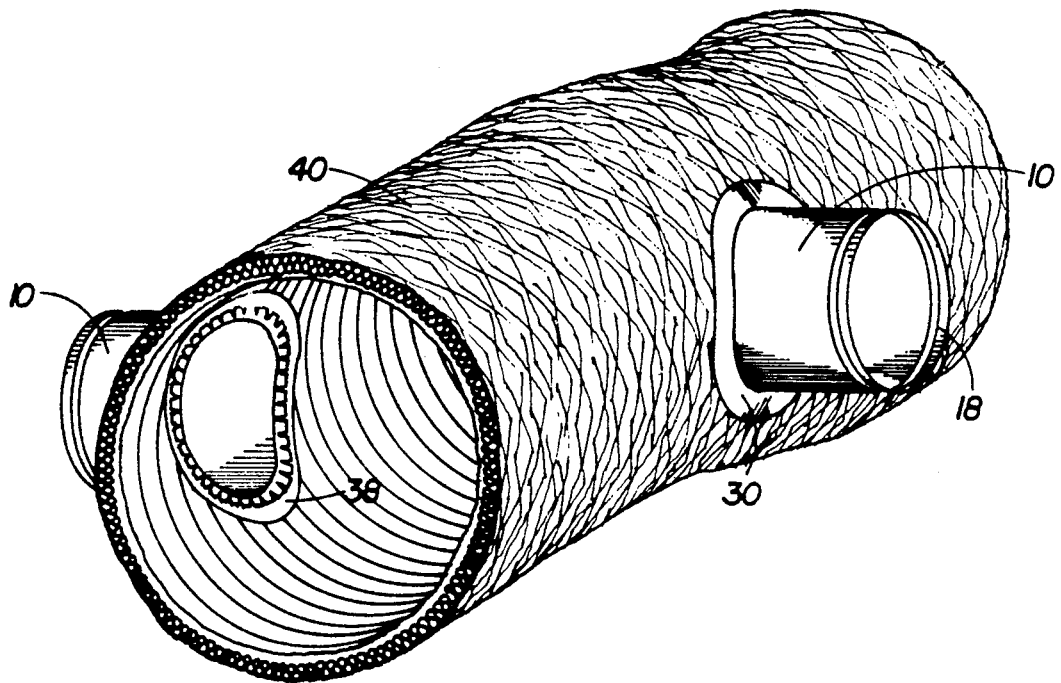
FIG. 3 is a perspective view showing a typical utilization of a pair of duct fittings in conjunction with a highly flexible trunk duct, with such duct fittings being installed in a relationship in which one fitting is deliberately not directly opposite the other fitting.
Figure 4:
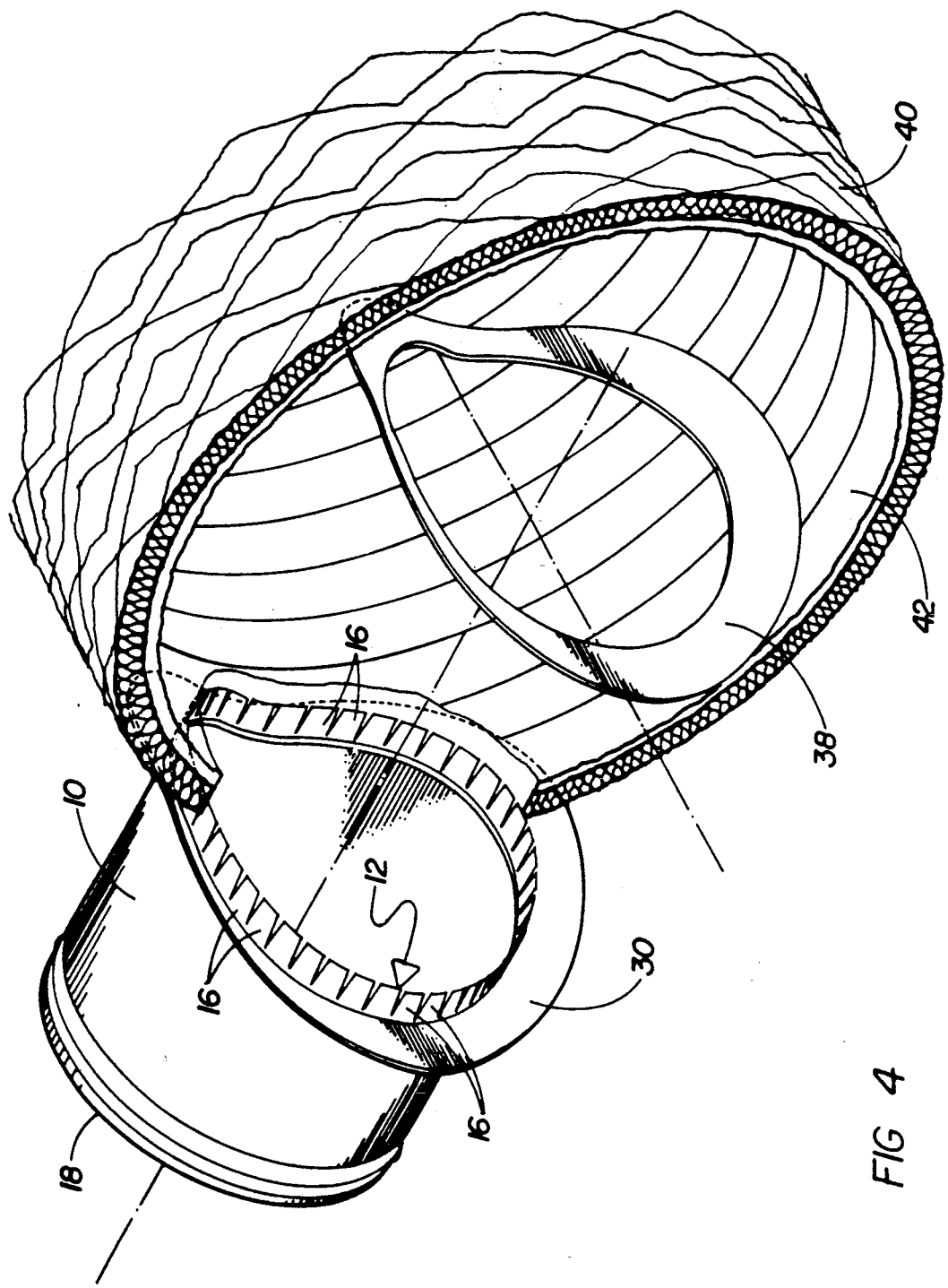
FIG. 4 is a view to a somewhat larger scale in order to show the flat inner ring used in the interior of the highly flexible ducting, in order to prevent the teeth located around the curved end of the duct fitting from cutting the interior surface of the highly flexible ducting, and to make possible a cooperative relationship with the flat outer ring such that any tendency toward possible leakage at the joinder of the duct fitting and the flexible ducting will be reduced to an absolute minimum.
Figure 5:
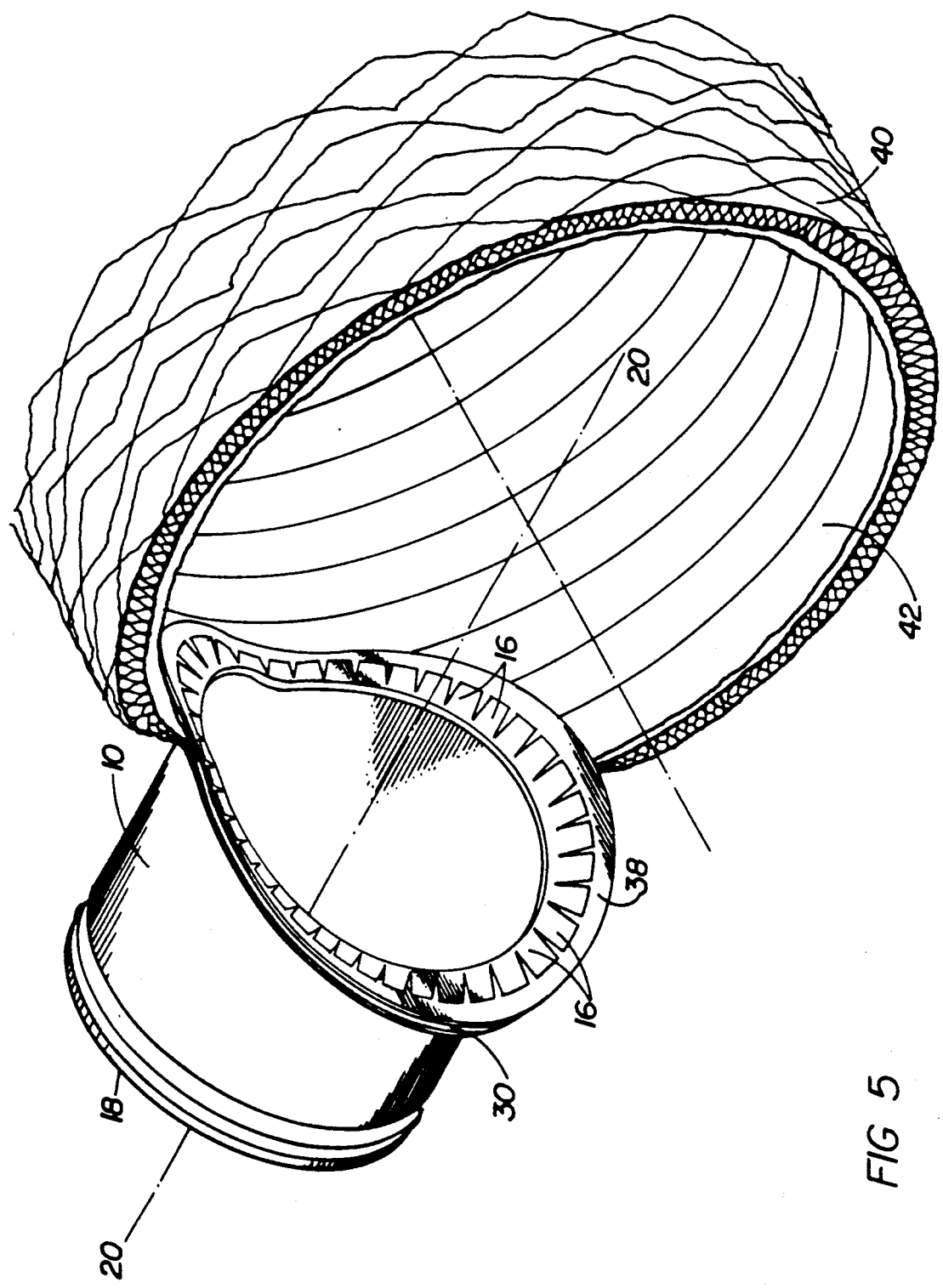
FIG. 5 is a view quite similar to FIG. 4, but showing the flat inner ring having moved into its operative position, which is a configuration closely conforming to the curved interior surface of the highly flexible ducting, and being held in such conforming, ducting sidewall-compacting relationship with the outer ring by the bent over teeth of the duct fitting, with any obstruction to the flow through the highly flexible ducting being minimized.

With initial reference to FIG. 1, it is to be seen that a duct fitting 10 in accordance with this invention is of generally cylindrical configuration, with the end 12 of the fitting possessing a distinctively curved configuration. This curved end 12 of the fitting 10 is particularly contoured for a highly effective, leak-free attachment in an essentially perpendicular relationship to the curved sidewall of a relatively large cylindrically-shaped duct constructed of highly flexible, easily deformed insulating material. This highly flexible air duct material, which is depicted in FIGS. 3 through 5, is variously known as flex duct, Thermaflex, and Dura-Flex, which material offers flexibility of installation, such as when dealing with misalignment between components, or in ducting around obstacles. All of the flexible ducting I use is covered with a metallized mylar outer jacket, which offers substantial tear resistance.

Returning to a consideration of FIG. 1, a number of slots 14 are disposed in an essentially evenly spaced relationship around the curved end 12 of the fitting, thus defining a series of teeth or fingers 16 of essentially equal size. These teeth are designed to be inserted into a hole formed in the sidewall of the highly flexible duct material, then to be bent over to prevent an undesirable withdrawal of the fitting from the relatively large, highly flexible duct.

In contrast with the shape of the curved end 12, the opposite end 18 of the duct fitting is conventional, in that it is an essentially flat end. In other words, the edges of the end 18 may be regarded as residing in a plane that is perpendicular to the longitudinal centerline 20 of the fitting.

As will be discussed hereinafter, my novel duct fitting is created from flexible sheet material, typically galvanized steel, with the ends overlapped to form a cylindrical shape, which ends are then secured together such as by rivets 22, or by other techniques, including spot welding and the like.

As will be noted from FIG. 1, the outermost edges of the teeth 16 are not in a common plane, but rather form a distinctively curved contour that closely conforms to the curvature of the sidewall of a trunk duct made of highly flexible ducting, with which it is to be connected in substantially a right angle. FIG. 1 reveals the utilization of the letter P at the uppermost and lowermost portions of the end 12, this letter representing what may be regarded as peaks. With reference to a clock face, the letter P has been applied at what might be regarded as the "12 o'clock" and the "6 o'clock" positions.

In contrast, the portions between the peaks are identified by the letter V, used to connote what may be regarded as valleys. Following the nomenclature introduced in the preceding paragraph, the valleys may be regarded as located at the "3 o'clock" and the "9 o'clock" positions. The upper and lower peaks P depicted in FIG. 1 may be regarded as extending substantially equal distances outwardly along the longitudinal centerline 20 of the duct fitting 10. Similarly, the pair of valleys V are disposed at corresponding locations with respect to the centerline 20.

The connection of the end 12 of the duct fitting 10 to the curved sidewall of a trunk duct made of highly flexible material in a most advantageous, virtually leak-free manner will shortly be discussed in connection with FIGS. 3 through 5.

Figure 2:
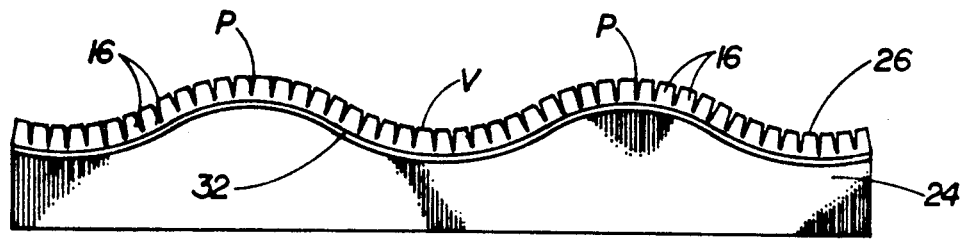
FIG. 2 is a plan view of the sheet material from which a novel duct fitting in accordance with this invention is constructed, with this figure revealing that one of the long edges of this sheet material is cut in a generally sinusoidally-shaped configuration, with teeth formed in a spaced relationship along such edge.

It is to be understood that the highly desirable configuration of the curved end 12 is created by utilizing a piece of flexible sheet material 24 having the configuration depicted in FIG. 2. Briefly stated, to form the duct fitting in accordance with this invention, the sheet material 24 is bent into an essentially cylindrical configuration, with the ends overlapped to a suitable degree, and then tightly secured together by suitable means, such as the rivets 22 as indicated in FIG. 1. A more detailed explanation of the preferred procedure will be set forth hereinafter.

It is to be noted that the upper edge 26 of the sheet material 24 of FIG. 2 corresponds to the curved end 12 of the fitting 10. The upper edge 26 is basically of sinusoidal configuration, whereas the opposite long edge of the sheet material is essentially straight. The letter P has been applied to FIG. 2 in order to connote the location of the peaks that are formed when such sheet material has been bent into a cylindrical configuration. Similarly, the letter V has been applied to locations on the sheet material where the valleys are formed when the sheet material has been bent into a cylindrical configuration and the overlapped ends secured together. Although I am not to be limited to this, I have found that the valley portions V are on the order of being two inches closer to the long straight edge of the sheet material 24 depicted in FIG. 2, than are the peak portions P.

Returning to a consideration of FIG. 1, it is desirable to prevent the duct fitting 10 from extending too far into the hole cut in the sidewall of the highly flexible trunk duct, and to this end I utilize a basically flat ring 30 of flexible material, that is secured in an appropriate position encircling the periphery of the duct fitting 10. The flat ring 30 is preferably located adjacent the apex of the slots 14 that are utilized to define the spaced series of teeth 16, with this ring also being known as the first ring. Inasmuch as it is desired for the curved end 12 of the fitting 10 to closely conform to the sidewall of the highly flexible trunk duct, with the teeth 16 extending essentially equal distances (before bending) into the interior large, highly flexible trunk duct, the flat ring 30 should reside in essentially the same curved plane as the plane in which the outermost tips of the teeth 16 reside. To this end, I utilize an indentation, channel or trough 32 along the upper or curved edge of the sheet material 24, as will be noted from FIG. 2.

Returning to FIG. 1, it will be noted that the indentation or channel 32 is visible at the broken away portion of the flat ring 30, thus making clear that the inner periphery of the flat ring 30 normally resides in the indentation or channel 32. Because the indentation or channel 32 is continuous, and of a generally sinusoidal configuration, this causes the flexible ring 30 to take on a curvature closely conforming to the curved sidewall of the large duct of highly flexible material.

Also in FIG. 1 it is to be noted that the interior of the fitting 10 reveals a generally sinusoidally-shaped bulge or ridge 34, which is of course brought about by the creation of the indentation or channel 32 that resides around the external circumference of the fitting 10. As will be seen, the indentation or channel 32 plays an important role in disposing the ring 30 in the most appropriate location on the exterior of the curved end 12 of the duct fitting 10.

With regard to a more detailed explanation of the manner in which I construct the novel duct fitting 10, the sheet material 24, in which the teeth 16 and the indentation or channel 32 have been formed, is first brought into a generally cylindrical configuration, and then the first ring 30 inserted thereover. The inner periphery of the ring 30 is then carefully positioned such that it resides in the circumferentially-extending indentation or channel 32. At this point the sheet material is moved radially outwardly so as to cause the interior periphery of the ring 30 to seat very tightly in the indentation or channel 32. First making sure that the sheet material accurately forms a right circular cylinder rather than being of reduced diameter at one end, the overlapping ends of the sheet material 24 are then secured together in the manner depicted at 22 in FIG. 1. As previously mentioned, rivets, spot welding, or other suitable techniques may be used for this purpose. At this point the ring 30 should be tightly seated in the indentation or channel 32.

Although the tight fit of the interior edge of the ring 30 in the indentation or channel 32 is sufficient in most instances to prevent undesired displacement of the ring from the most appropriate location, in order that the ring 30 will not be displaced during handling or shipping, I may further stabilize the ring 30 in the desired curved configuration by bending three or four of the teeth 16 outwardly, and then riveting or otherwise securing those three or four teeth to the ring 30. This does not significantly reduce the closeness of the interfitting relationship between the duct fitting 10 and the curved sidewall of the large, highly flexible trunk duct, for there remain an ample number of other teeth 16 to engage the interior surface of the highly flexible duct at the location of the hole, such that the duct fitting is locked to the relatively large trunk duct in a virtually leak-free manner, with the air flow through the large duct not being in any manner obstructed.

Turning to FIG. 3, I there show a typical section of the highly flexible ducting 40, with which my novel duct fittings 10 are ideally suited for use. As previously mentioned, this highly flexible ducting may be regarded as constructed of a polymeric inner duct bonded permanently to a coated spring steel wire helix and supporting a thick fiberglass insulating blanket. The assembly is completed by an outer jacket of metallized mylar serving as an outer vapor barrier, which jacket resists tearing and external damage.

As depicted in FIG. 3, the duct fittings 10 are typically connected to the relatively large, highly flexible ducting 40 in an offset relationship, or in other words, the one duct fitting 10 is disposed in a spaced-apart relationship to the other duct fitting 10.

With regard to FIG. 4, it will be seen that this is a view to a somewhat larger scale than in FIG. 3, in order to show the use of a basically flat inner ring 38 employed in the interior of the highly flexible ducting 40, in order to prevent the teeth 16 located around the curved end 12 of the duct fitting 10 from cutting or in any way damaging the interior surface 42 of the highly flexible ducting 40. For this reason I choose to refer to the flat inner ring 38 as interior sidewall protection means, although it serves a very important additional function as well.

Turning now to a careful consideration of FIG. 5, this is a view quite similar to FIG. 4, but here showing the flat inner ring 38 having moved into its operative position, which involves a configuration closely conforming to the curved interior surface 42 of the highly flexible ducting 40, as well as to the configuration essentially matching that of the first ring 30, as it resides in the generally sinusoidally-shaped indentation or channel 32.

As will be apparent from FIG. 5, the second or inner ring 38 is held in such conforming relationship to the interior surface of the large duct by the bent over teeth 16 of the duct fitting. It is to be understood that this amounts to a carefully interfitted relationship of the duct fitting with the large, flexible duct 40, such that virtually no leakage will take place at the joint, and with any obstruction to the flow of air through the highly flexible ducting being minimized.

As to the installation of my novel duct fitting in a hole in the highly flexible ducting 40, the workman extends his arm into the duct fitting and by a suitable application of pressure, he accomplishes a degree of compacting of the sidewall of the flexible ducting around the periphery of the hole, which of course is between the inner and outer rings 38 and 30, respectively. While holding the sidewall of the ducting in such compacted relationship, the workman bends over the teeth 16 of the duct fitting into firm contact with the second or inner ring 38, thus to hold the fitting in a tight, virtually leak-free relationship with the highly flexible ducting.

It is therefore obvious that the first and second (inner and outer) rings 30 and 38 serve as a form of structural support for the sidewalls of the flexible ducting, as well as a highly effective means for securing the components in a virtually leak-free relationship as a result of the rings undertaking a curvature closely conforming to that of the sidewall of the flexible ducting 40, as they tightly grip the flexible ducting therebetween.

Figure 6:
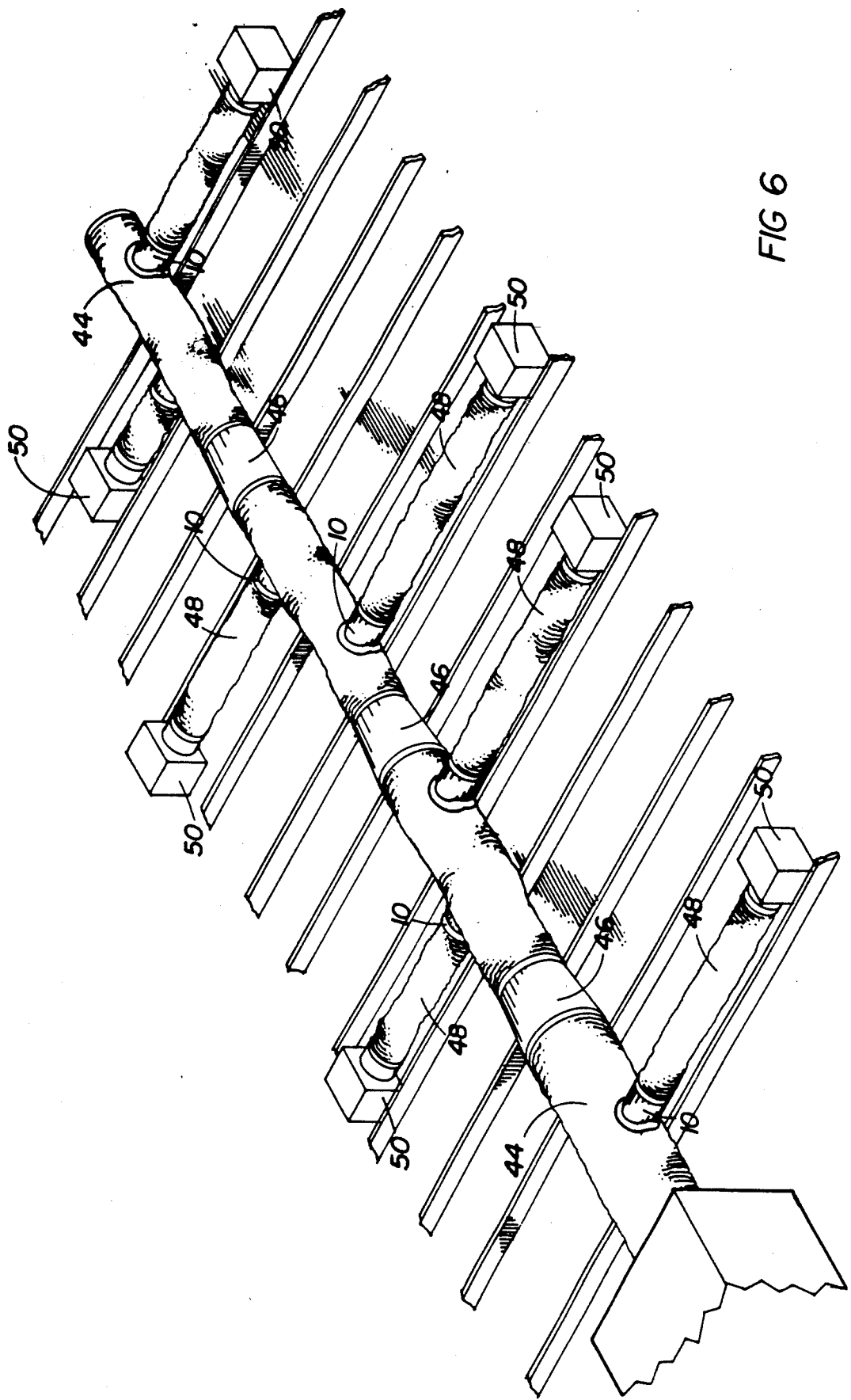
FIG. 6 shows one possible layout of a trunk duct constructed of highly flexible ducting, illustrating the utilization of my novel duct fittings at spaced locations along the length of the trunk duct.

In FIG. 6, I show a length of the large, highly flexible ducting utilized as a trunk duct 44, being connected in this instance to a typical plenum for an air handler. In conformity with good practice, I reveal the use of several reducing connectors 46 at spaced locations along the duct 44, with these reducing connectors typically being of galvanized sheet metal. In this particular instance I reveal the ducting 44 being supported from below by the rafters located above the ceiling of the rooms being supplied with cooled or heated air. This support arrangement causes the highly flexible ducting 44 to undertake an essentially cylindrically-shaped configuration. It is to be understood, however, that in many other instances, the highly flexible trunk duct 44 could reside in a curving or obstruction-avoiding configuration. Also, the trunk duct 44 could be utilized in a relationship in which it is supported below appropriate structural means by a series of straps, disposed at spaced locations along the duct.

Connected at a number of spaced locations along the trunk duct 44 are a series of my novel duct fittings 10, with branch ducts 48 connected in each instance to the ordinary, planar ends 18 of the duct fittings 10. Suitable clamping rings are utilized to secure each branch duct to the respective duct fitting 10 as well as to the respective distribution outlet 50. As will be understood by those skilled in the art, suitable registers are utilized in the ceilings of the rooms below, attached either to the members 50 or directly to the ceiling.

As is obvious, my novel fittings are not limited to use with flexible ducting utilized only in ceilings, for my novel duct fittings may be utilized with ducting in other locations as well.

I am not to be limited to any particular material in the construction of duct fittings in accordance with this invention, but I have found 28 gage or 30 gage galvanized sheet metal to be quite appropriate in most circumstances.

As should now be clear, my invention provides an improved duct fitting of relatively low cost, that can be utilized with highly flexible ducting in a greatly simplified, virtually leak-free manner, without necessitating the use of any obstruction in the interior of the highly flexible ducting. Importantly, the installation of my novel duct fitting does not require access to the end of a trunk duct, for it can be installed by merely cutting a hole of the appropriate size at a desired location along the trunk duct.

It should also be clear that I have provided a considerably improved duct fitting with a curved end closely conforming to the curvature of the sidewall of highly flexible ducting, with such fitting comprehending the use of flat, flexible rings utilized in the interior as well as on the exterior of the juncture with the highly flexible ducting. In this way a highly advantageous, secure, virtually leak-free connection with the flexible ducting can be assured, with any consequential obstruction to the flow of air through the flexible ducting being carefully avoided.

I claim:

1. A duct fitting of generally cylindrical configuration for attachment to a flexible duct of relatively large size, such duct having a curved sidewall of highly flexible material, in which sidewall a hole of particular size has been created, said duct fitting being constructed of deformable sheet material and having first and second open ends, said first end having a curvature conforming to the configuration of the curved sidewall of the flexible duct with which it is to be used, and a diameter closely conforming to the hole created in the sidewall of the flexible duct, said first end of said duct fitting having a plurality of bendable teeth arranged in a non-planar array around its circumference, said teeth of said first end being insertable into the hole created in the curved sidewall of the flexible duct, and then bent over into conforming engagement with the curved interior surface of the flexible duct, means inside the flexible duct for protecting the interior of the duct from the bent-over teeth, and means for limiting the insertion of said first end of said duct fitting into the hole in the flexible duct.

2. The duct fitting of generally cylindrical configuration as recited in claim 1 in which said means for limiting insertion is a ring of curved contour, the curvature of said ring conforming to the curvature of the curved sidewall of the flexible duct.

3. The duct fitting of generally cylindrical configuration as recited in claim 1 in which said means for protecting the interior of the flexible duct is a ring of curved contour, the curvature of said ring substantially conforming to the curvature of the curved interior of the flexible duct.

4. A duct fitting of generally cylindrical configuration for attachment in a right-angle relationship to a relatively large, generally cylindrically-shaped flexible duct having a curved sidewall of flexible, easily deformed material, in which a hole of particular size has been created, said duct fitting being constructed of deformable sheet material and having first and second open ends, said first end having a curvature conforming to the configuration of the curved sidewall of the flexible duct with which it is to be used, and said second end being adapted to receive thereon, a relatively small branch duct to be connected in a leak-free manner to the flexible duct, said first end of said duct fitting having a plurality of short, lateral slots disposed at spaced locations around its circumference, thus to define a plurality of bendable teeth arranged in a non-planar array, said teeth of said first end being insertable into the hole created in the curved sidewall of the flexible duct, and then bent over into conforming engagement with the curved interior surface of the flexible duct, thus to lock said duct fitting into the flexible duct, means inside the flexible duct for protecting the interior of the flexible duct from the bent-over teeth, and means for limiting the insertion of said first end of said duct fitting into the hole in the flexible duct.

5. The duct fitting of generally cylindrical configuration as recited in claim 4 in which said means for limiting insertion is a ring of curved contour, the curvature of said ring conforming to the curvature of the curved sidewall of the flexible duct.

6. The duct fitting of generally cylindrical configuration as recited in claim 5 in which said means for protecting the interior of the flexible duct is a ring of curved contour, the curvature of said ring conforming to the curvature of the curved interior of the flexible duct, the width of said ring being greater than the length of said teeth.

7. The duct fitting of generally cylindrical configuration as recited in claim 6 which said ring of curved contour, in conjunction with said means for limiting insertion of said duct fitting into the flexible ducting, form means for compacting to some extent, the sidewall of the flexible ducting, for reasons of duct fitting support and for assuring a virtually leak-free connection.

8. A duct fitting of generally cylindrical configuration for attachment in a right-angle relationship to a relatively large cylindrically-shaped flexible duct having a curved, easily deformed flexible sidewall of insulating material, in which curved sidewall, a hole of a particular diameter has been created, said duct fitting being constructed of an elongate sheet of bendable material that, before being Assembled into a generally cylindrical configuration, had a first long edge cut into a generally sinusoidal configuration, said duct fitting, when formed into a generally cylindrical configuration, having a first end possessing a curvature conforming to the configuration of the curved sidewall of the flexible duct with which it is to be used, said second end of said duct fitting being adapted to receive thereon, a relatively small branch duct to be connected to the flexible duct, said first end of said duct fitting having a plurality of spaced, bendable teeth disposed about its periphery, arranged in a non-planar array, said teeth of said first end being insertable into the hole created in the curved sidewall of the flexible duct, sidewall protection means insertable into such hole, followed by the insertion into the hole of said teeth, said teeth then being bent over into conforming engagement with said sidewall protection means, which has assumed the configuration of the curved interior surface of the flexible ducting, thus to secure the branch fitting to the flexible ducting in a leak-free manner.

9. The duct fitting of generally cylindrical configuration as recited in claim 8 in which said duct fitting contains on its exterior, means for limiting the insertion of said duct fitting into the hole in the sidewall of the flexible ducting, said sidewall protection means being utilized in conjunction with said means for limiting the insertion of said duct fitting, for bringing about a degree of compacting the sidewall of the flexible ducting, for reasons of duct fitting support and for assuring a virtually leak-free connection.

10. A duct fitting of generally cylindrical configuration as recited in claim 9 in which said means provided for limiting the insertion of said first end of said duct fitting is a ring of curved contour, secured to the outer periphery of said duct fitting, the curvature of said ring conforming to the curvature of the curved sidewall of the flexible duct.

11. A duct fitting of generally cylindrical configuration as recited in claim 10 in which said ring of curved contour is seated in a curved groove extending about the exterior periphery of said duct fitting.

12. A duct fitting of generally cylindrical configuration as recited in claim 8 in which said sidewall protection means is a flat flexible ring having an inner diameter the same as the hole in the flexible duct, and a width greater than the length of the individual teeth formed on said first end, thus to effectively prevent the tearing of the interior of the flexible duct by the ends of said teeth, said flat flexible ring, upon being closely contacted by the teeth being bent over, then assuming the configuration of the curved interior surface of the flexible duct.

13. A duct fitting of generally cylindrical configuration for attachment in a right-angle relationship to a relatively large cylindrically-shaped flexible duct having a curved, easily deformed sidewall in which a hole of a certain size has been created, said duct fitting being constructed of deformable sheet material that, before being assembled into a generally cylindrical configuration, was defined by an elongate sheet of material having first and second long edges, said first long edge being cut into a generally sinusoidal configuration, with a plurality of short lateral slots formed at spaced locations along said first long edge, said duct fitting, when formed into a generally cylindrical configuration, having a first end possessing a curvature conforming to the configuration of the curved sidewall of the flexible duct with which it is to be used, namely said first end having a curvature involving a pair of oppositely located peaks disposed in a symmetrical relationship, and a pair of oppositely located valleys disposed between said peaks, said second end of said duct fitting being adapted to receive thereon, a relatively small branch duct to be connected to the flexible duct, said first end of said duct fitting having, as a result of such slots, a plurality of bendable teeth arranged in a curving, non-planar array, said teeth being insertable into the hole created in the curved sidewall of the flexible duct and then bent over into a position preventing withdrawal of said duct fitting from the flexible duct, and insertion-limiting means disposed on the exterior of said duct fitting, for limiting the insertion of said duct fitting into the flexible ducting.

14. The duct fitting of generally cylindrical configuration as recited in claim 13 in which said insertion-limiting means is a ring of curved contour, secured to the outer periphery of said duct fitting, the curvature of said ring conforming to the curvature of the curved sidewall of the flexible duct.

15. The duct fitting as recited in claim 13 utilized in conjunction with sidewall protection means insertable through such hole into the interior of the flexible duct, the insertion of said sidewall protection means being followed by the insertion into such hole of said bendable teeth, said teeth then being bent over into conforming engagement with said sidewall protection means, which has assumed the configuration of the curved interior surface of the flexible duct, thus to secure said duct fitting to the flexible duct in a leak-free manner.

16. A duct fitting of generally cylindrical configuration as recited in claim 15 in which said sidewall protection means is a flat flexible ring having an inner diameter the same as the hole in the flexible duct, and a width greater than the length of the individual teeth formed on said first end, thus to effectively prevent the tearing of the interior of the flexible duct by the ends of said teeth, said flat flexible ring, upon being contacted by the teeth being bent over, being caused to assume the configuration of the curved interior surface of the flexible duct.

17. The duct fitting of generally cylindrical configuration as recited in claim 16 in which said flat flexible ring, in conjunction with said insertion-limiting means, form means for compacting to some extent, the sidewall of the flexible ducting, for reasons of duct fitting support and for assuring a virtually leak-free connection.

18. A duct fitting of generally cylindrical configuration for att t in a right-angle relationship to a relatively large, flexible duct having a curved, flexible, easily deformed sidewall, said duct fitting being constructed of deformable sheet material that, before being assembled into a generally cylindrical configuration, was an elongate piece of material having first and second long edges, said first long edge being of a generally sinusoidal configuration, and having therein a spaced series of short lateral slots, a sinusoidal groove disposed in an evenlyspaced relationship to said first edge of sinusoidal configuration, located adjacent the base of said slots, said duct fitting, when formed into a generally cylindrical configuration, having a first end possessing a curvature conforming to the configuration of the curved sidewall of the flexible duct with which it is to be used, namely said first end having a curvature involving a pair of oppositely located peaks disposed in a symmetrical relationship with an intervening pair of oppositely located valleys, said second end of said duct fitting being adapted to receive thereon, a relatively small branch duct to be connected in a leak-free manner to the flexible duct, said slots on said first end of said duct fitting defining a plurality of bendable teeth arranged in a non-planar array, and a first substantially flat ring whose inner diameter is essentially the same as the effective diameter of said sinusoidal groove residing adjacent said teeth, said first ring undertaking a curvature conforming to the curvature of the curved sidewall of the flexible duct, said first ring serving to limit the insertion of said first end of said duct fitting into the hole in the flexible duct, said teeth thereafter being bent over into contact with the curved interior surface of the flexible duct.

19. The duct fitting of generally cylindrical configuration as recited in claim 18 in which said first flat ring is brought into firm contact with the external sidewall of the flexible duct before said teeth are bent over into contact with the curved interior surface of the flexible duct.

20. The duct fitting of generally cylindrical configuration as recited in claim 18 utilized in conjunction with a second substantially flat, flexible ring whose inner diameter is the same as the diameter of the hole cut in the flexible duct, said bendable teeth being insertable into the hole cut into the curved, flexible sidewall of the flexible duct, subsequent to the insertion into the hole of said second flat, flexible ring, such teeth then being bent over into conforming engagement with said second flat ring, which has assumed the configuration of the curved interior surface of the flexible duct, thus to secure the duct fitting to the flexible duct in a tightly sealed relationship.

21. The duct fitting of generally cylindrical configuration as recited in claim 20 in which said first and second flat rings form means for compacting to some extent, the sidewall of the flexible ducting, for reasons of duct fitting support and for assuring a virtually leak-free connection.

22. The method for connecting a branch duct in a right-angle relationship to a relatively large, flexible duct having a curved, flexible, easily deformed sidewall by the use of a generally cylindrically-shaped duct fitting constructed of deformable sheet material and inserted into a hole of a certain size located in the sidewall of the flexible duct, this method comprising the steps of selecting an elongate piece of deformable sheet material having first and second long edges, forming said first long edge into a generally sinusoidal configuration, and forming in such long edge a spaced series of short teeth as well as a continuous groove located adjacent the bottoms of said teeth, forming said sheet material into a generally cylindricallyshaped duct fitting by placing the ends of the sheet material together in an overlapping relationship, placing a flat ring of flexible material around said duct fitting, with the inner circumference of said ring residing in said continuous groove, expanding the sheet material outwardly into cylindrical form, so as to cause said flat ring to seat tightly in said continuous groove and thus to undertake a curved configuration, securing said overlapped ends tightly together to cause said duct fitting to retain its cylindrical shape, said duct fitting having, because of the generally sinusoidal configuration of said first long edge, a first end possessing a curvature conforming to the configuration of the curved sidewall of the flexible duct with which it is to be used, inserting said first end into the hole in the sidewall of the flexible duct, and bending the teeth over into tight, closely conforming contact with the interior of said flexible duct, said second end of said duct fitting being adapted to receive thereon, a relatively small branch duct to be connected in a leak-free manner to the flexible duct.

23. The method for connecting a branch duct in a right-angle relationship to a relatively large, flexible duct as defined in claim 22 in which a second flat ring of flexible material is utilized, said second flat ring being inserted into the hole in the flexible duct prior to the insertion therein of the teeth formed on said first long edge, said second flat ring serving as a sidewall protecting means, serving to prevent the teeth from defacing the interior sidewall of the flexible duct.

* * * * *